(12) United States Patent
Hauf

(10) Patent No.: US 6,883,358 B2
(45) Date of Patent: Apr. 26, 2005

(54) METHOD OF PRODUCING SLIDING SLEEVES FOR GEARSHIFT MECHANISMS

(75) Inventor: Gerald Hauf, Ingelheim (DE)

(73) Assignee: Hay-Tec Automotive GmbH & Co. KG, Bad Sobernheim (DE)

(*) Notice: Subject to any disclaimer, the term of this patent is extended or adjusted under 35 U.S.C. 154(b) by 62 days.

(21) Appl. No.: 10/419,715

(22) Filed: Apr. 21, 2003

(65) Prior Publication Data
US 2003/0226250 A1 Dec. 11, 2003

(30) Foreign Application Priority Data
Apr. 22, 2002 (DE) .......................................... 102 17 848

(51) Int. Cl.[7] .............................................. B21D 22/00
(52) U.S. Cl. ...................... 72/85; 72/84; 72/96; 72/98; 29/893.32
(58) Field of Search ................................ 72/82, 83, 84, 72/85, 96, 98; 29/873.32

(56) References Cited

U.S. PATENT DOCUMENTS 3,768,291 A * 10/1973 Rieger ........................... 72/78
5,096,037 A    3/1992 Knoess et al.
5,392,517 A    2/1995 Lyon et al.
5,868,050 A * 2/1999 Feldmeier ....................... 82/47
6,026,666 A * 2/2000 Zimmermann et al. ........ 72/85
6,295,854 B1 * 10/2001 Stein et al. ..................... 72/96
6,334,349 B1 * 1/2002 Rolf ............................... 72/84

FOREIGN PATENT DOCUMENTS

| DE | 196 36 567 | 7/1997 |
| DE | 100 18 093 | 11/2001 |
| EP | 0 955 481  | 11/1999 |
| EP | 1 150 028  | 10/2001 |

* cited by examiner

*Primary Examiner*—Ed Tolan
(74) *Attorney, Agent, or Firm*—Flynn, Thiel, Boutell & Tanis, PC

(57) ABSTRACT

A method of producing a sliding sleeve for gearshift mechanisms includes two forming steps. In the first forming step a preform, which has been pushed onto a tool mandrel with an external toothing, is formed by roller spinning so as to form on the inner circumferential surface of the preform the toothing implemented on the outer circumferential surface of the tool mandrel. Subsequently, the thus formed preform is formed by profile rolling on its outer circumferential surface so as to obtain a formed part. Finally, the tool mandrel is removed from the formed part.

12 Claims, 2 Drawing Sheets

METHOD OF PRODUCING SLIDING SLEEVES FOR GEARSHIFT MECHANISMS

The present invention relates to a method of producing sliding sleeves for gearshift mechanisms.

Sliding sleeves are components provided in manual gearshift mechanisms; when a gear is being engaged, they are displaced axially on the gearbox shaft in response to the movement of the gear lever, whereby they close the power flow for the gear to be engaged. Sliding sleeves fundamentally have a straight internal toothing which is additionally modified by bevels ("slope") so as to permit simple engagement and so as to prevent an engaged gear from slipping out ("undercut portion").

It is common practice to produce sliding sleeves normally from a blank, which has been produced by forming, preferably forging, and the diameter of which is turned completely. On the inner circumferential surface a toothing is then produced by broaching or slotting. Subsequently, the intermediate product is again machined; for example, details are formed on the outer circumferential surface and/or on the end faces of the of the rotationally symmetric component. The toothing is in most cases provided with bevels—slope and undercut portion—by machining or forming processes so as to guarantee the above-mentioned functionality. Finally the component is deburred and then case-hardened in a typical way.

For producing sliding sleeves, it is also known to first enlarge the diameter of an annular blank by ring rolling, especially cold rolling, and to form then a contour, viz. the shift-fork recess, on the outer circumferential surface of the component by means of rolling. This process of radial ring rolling is an alternative to the above-mentioned turning. Subsequently, a toothing is formed in a known way on the inner circumferential surface by means of broaching. The above-mentioned subsequent steps can follow. The internal toothing can in this case be induction-hardened instead of case-hardened, since the outer circumferential surface has already been hardened by cold forming during the rolling process. Accordingly, also the functional surfaces formed by the contouring of the outer circumferential surface are hardened.

The above-described production processes are comparatively complicated and this is disadvantageous not least insofar as the above-described sliding sleeves are often produced as bulk articles for vehicle transmissions or the like.

It is the object of the present invention to provide an economical method of producing sliding sleeves for gearshift mechanisms.

For achieving the above object, the present invention suggests a method of producing sliding sleeves wherein
- a preform is pushed onto a tool mandrel provided with an external toothing,
- the preform is then formed by means of roller spinning through at least one roll moving axially along the circumferential surface of the preform so as to form an image of the external toothing of the tool mandrel on the inner circumferential surface of the preform,
- the formed preform is then formed by profile rolling by means of one or a plurality of profiled rolls on its outer circumferential surface so as to obtain a formed part having a profile on the outer circumferential surface thereof,
- and the tool mandrel is finally removed from said formed part.

In contrast to the known methods, the method according to the present invention is so conceived that the internal toothing is first formed on the preform, said internal toothing being formed by a forming step, the so-called roller spinning. This is followed by another forming step, viz. profile rolling, so as to form the contoured outer surface of the component, the tool mandrel used for the roller spinning process remaining in the formed preform during profile rolling. At the end of these two forming method steps, the outer circumferential surface as well as the inner circumferential surface of the rotationally symmetric component have a form which is at least very similar to their final shape.

The method according to the present invention can be used for producing sliding sleeves without any necessity of machining the inner circumferential surface or the outer circumferential surface. This permits the components in question to be produced in a particularly economical manner.

Normally, inlet/outlet zones which have to be thrown away are obtained on the outer circumferential surface at the end faces of the component after the profiling forming process carried out by roller spinning. These zones are normally cut off in a subsequent processing step. The rotationally symmetric component provided with an internal toothing and a contoured outer surface is then finished.

According to another preferred embodiment of the present invention, a plurality of axially successive profile sections are formed on the outer circumferential surface of the formed preform, and, after the removal of the tool mandrel, these profile sections are cut off so as to form several components, each of said components comprising one of the profile sections. In the case of this preferred further development of the method according to the present invention, the formed part is divided into a plurality of annular pieces which were originally arranged one after the other. Each individual one of these annular pieces is provided with an internal toothing and with a profile on the outer circumferential surface thereof. It follows that, in the successive forming steps, a plurality of initially united components is produced, which are then, preferably by a machining operation, separated from one another.

In order to simplify the forming tools used for executing the present method and with respect to a mass production of identical components, it is suggested that, in accordance with a further preferred embodiment of the present invention, identical profile sections should be formed on the outer circumferential surface of the formed preform.

According to a preferred further development of the present invention it is suggested, not least with respect to a reduction of the working time, that the profile sections should be formed simultaneously.

According to a particularly preferred embodiment, the profile sections are formed by profile rolling by means of at least one roll acting against the outer circumferential surface of the formed preform. The surface hardness which is necessary at the outer circumferential surface of the sliding sleeve can be adjusted in this way. A separate method step in which at least the outer circumferential surface of the component is hardened can therefore be dispensed with.

Further details, advantages and features of the present invention can be seen from the following description of an embodiment in combination with the drawing, in which.

Figure 1:
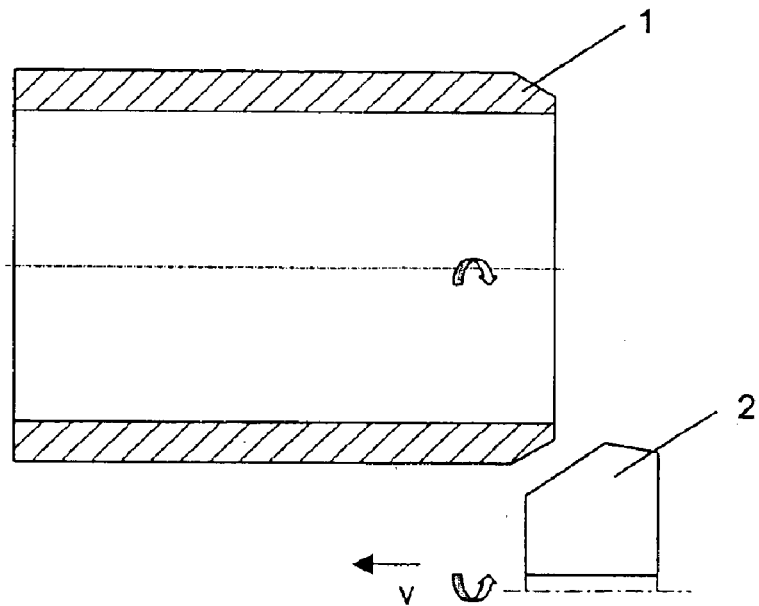
FIG. 1 shows a longitudinal sectional view of an embodiment of a preform prior to roller spinning.

In the embodiment described hereinbelow with regard to the execution of the method according to the present invention, a tubular semifinished product is used as a perform 1 (FIG. 1). A tool mandrel, which is not shown and which is provided with an external toothing, is inserted into said preform 1, as has been described in more detail in DE-C2-196 36 567, the disclosure thereof being incorporated in this application by reference. The preform, together with the tool mandrel, is axially fixed in a holding device and clamped such that it is rotatably supported.

The preform 1 can also be implemented as a pot-shaped component, one end face of which is provided with a radially inwardly directed collar so to facilitate axial fixing of said preform during roller spinning.

At least one, preferably a plurality of spinning rolls 2, which are arranged such that they are circumferentially evenly distributed with respect to the preform 1 is/are then caused to act on the outer circumferential surface of the preform 1. These spinning rolls 2 are arranged at a distance from the central longitudinal axis of the preform 1 which is smaller than the distance between said central longitudinal axis and the outer circumferential surface of said preform. In the embodiment shown, the spinning roll 2 is advanced towards the preform 1 from the side of the chamfered end face, i.e. in FIG. 1 from the right-hand side. When the at least one spinning roll is being advanced, a rotating relative movement between the preform 1 and the spinning roll 2 is produced, preferably by rotating the preform 1 together with the tool mandrel. In so doing, the spinning roll 2, whose axis of rotation is oriented essentially parallel to the axis of rotation of the preform 1, is moved axially past the outer circumferential surface of the preform 1 in the direction of the arrow V. This has the effect that, on the one hand, a radial flow of material is produced in the preform 1 whereby an image of the external toothing provided on the tool mandrel will be formed on the inner circumferential surface of the preform 1. On the other hand, radially projecting material of the preform 1 will be pushed ahead of said spinning roll 2 between the tool mandrel and the spinning roll 2, when said spinning roll 2 is axially advanced.

During working by means of the spinning rolls, each spinning roll 2 is only in contact with an axial subsection of the cylinder wall area of the preform 1 at any moment of the rotational movement between the spinning roll 2 and the preform 1. Accordingly, the external toothing formed on the tool mandrel will be pressed into the inner circumferential surface of the preform only in this subsection. In the embodiment shown in FIG. 1, the distance between the axis of the spinning roll 2 and the axis of the preform 1 is kept constant. Hence, a flat cylindrical outer surface is produced on the preform during the roller spinning process. By advancing the spinning rolls radially to the preform it is, however, also possible to produce, within certain limits, an outer contour with small diameter steps, but the sliding-sleeve profile which is deeply cut due to the shift-fork recess cannot be produced by roller spinning alone.

Figure 2:
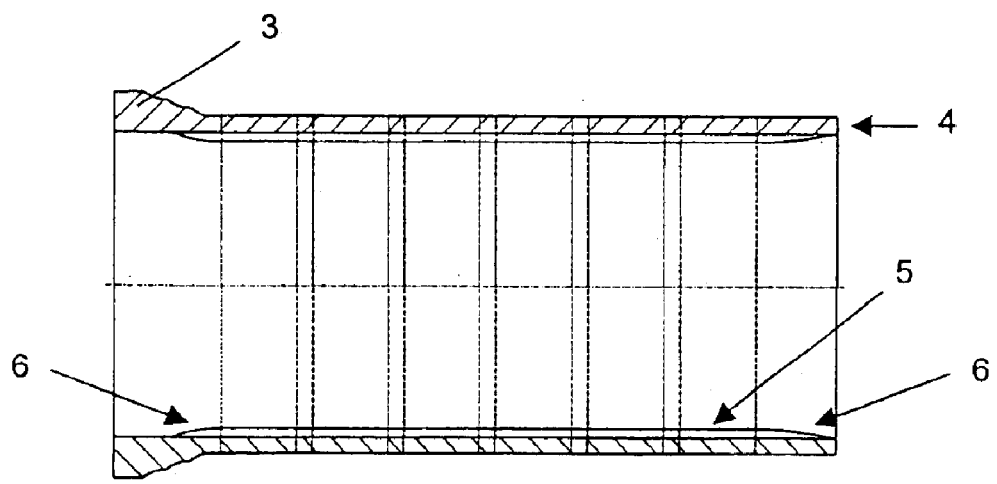
FIG. 2 shows the preform according to FIG. 1 after roller spinning.

The end portion, at which forming of the preform 1 by means of the spinning roll 2 ends, is normally provided with a formed end shoulder 3 (cf. FIG. 2).

FIG. 2 shows the preform 1 of FIG. 1 after the first forming step. The preform 4 shown in said FIG. 2 is provided with an internal toothing 5 having end portions 6 which shallow out towards the respective end faces. Between these end portions 6 at the end faces the toothing 5 is fully imaged by the spinning rolls in the embodiment shown, i.e. it corresponds to the toothing provided on the tool mandrel.

Figure 3:
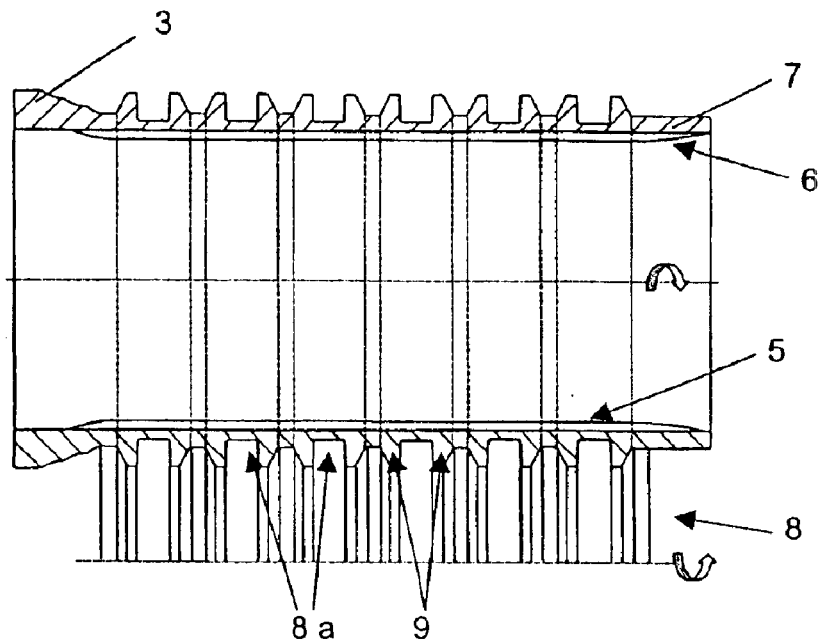
FIG. 3 shows the preform according to FIG. 2 during profiling forming on the outer circumferential surface.

The outer circumferential surface of the preform 4 shown in FIG. 2 is formed in a subsequent method step by profile rolling by means of one or a plurality of profiled tools on said outer circumferential surface until a formed part 7 according to the representation in FIG. 3 has been produced. One or a plurality of shape rolls 8, which cover the whole width of the preform or only part of the width of the preform, can be in engagement with the circumference of the preform, the individual shape rolls 8 being displaced relative to one another by a certain angle of rotation. These shape rolls 8 each have a positive contour which corresponds to the negative contour on the outer circumference of the toothing 5 in FIG. 3.

A rotating relative movement is produced between the preform 4 shown in FIG. 2 and the shape rolls 8. During this relative movement the axial distance between the shape rolls 8 and the axis of rotation of the preform 4 and of the tool mandrel is continuously reduced. This has the effect that the preform material displaced by the six disk segments 8a formed on the outer circumferential surface of the shape rolls 8 will flow into the neighboring cavities 9 enclosed by the shape roll 8 and the outer circumferential surface of said preform 4, until the contour, which can be seen in FIG. 3 on the outer circumferential surface of the preform, has been formed in the course of the increasing reduction of the axial distance between the shape rolls 8 and the preform 4. At the end of this forming step, which is typically executed under cold rolling conditions, the formed part 7 is finished.

Following this, the shape rolls 8 are removed from the outer circumferential surface of the formed part 7. The axial clamping of the formed part 7 and of the tool mandrel is released. The tool mandrel is forced out of the formed part 7.

Figure 4:
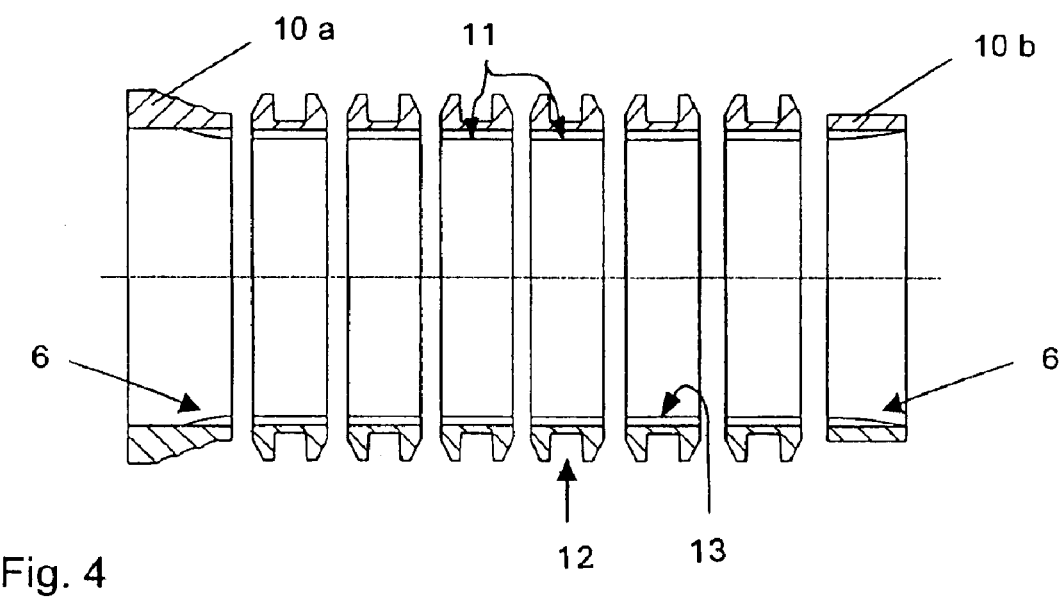
FIG. 4 shows the formed part according to FIG. 3 after the separation of six identically formed components.

Subsequently (FIG. 4) eight annular segments are cut off from the formed part 7. The two outer segments 10a, 10b are thrown away. These segments include the end portions 6 of the internal thread and the end shoulder 3. The six other intermediate segments each define identically formed, rotationally symmetric components 11 having a contoured external surface. In the present case, the rotationally symmetric components 11 are implemented as sliding sleeves having a shift-fork recess 12 and a straight internal toothing 13.

LIST OF REFERENCE NUMERALS 1 preform
2 spinning roll
3 end shoulder
4 formed preform
5 toothing
6 end zone
7 formed part
8 shape roll
8a disk segment
9 cavity
10a end piece
10b end piece
11 component
12 shift-fork recess
13 internal toothing

What is claimed is:

1. A method of producing sliding sleeves for gearshift mechanisms, wherein a preform is pushed onto a tool mandrel provided with an external toothing extending in an axial direction of the tool mandrel, the preform is then formed by means of roller spinning through at least one roll moving axially along the circumferential surface of the preform so as to form an image of the external toothing of the tool mandrel on the inner circumferential surface of the preform, the formed preform is then formed by profile rolling by means of one or a plurality of profiled rolls on its outer circumferential surface by continuously reducing the distance between the axis of said profiled rolls and the axis of said preform so as to obtain a formed part having a profile on the outer circumferential surface thereof, thereby readily obtaining a desired surface hardness at the outer circumference of the sliding sleeve made from the formed part, and the tool mandrel is finally removed from the formed part.

2. A method according to claim 1, wherein a plurality of axially successive profile sections are formed on the outer circumferential surface of the formed preform, and that, after the removal of the tool mandrel, several components are cut off from the formed part, each of said components comprising one of the profile sections.

3. A method according to claim 2, wherein identical profile sections are formed on the outer circumferential surface of the formed part.

4. A method according to claim 1, wherein a plurality of axially successive profiles are formed simultaneously an the outer circumferential surface of the formed preform, and that, after the removal of the tool mandrel, several components are cut off from the formed part, each of said components comprising one of the profile sections.

5. A method according to claim 4, wherein identical profile sections are formed on the outer circumferential surface of the formed part.

6. A method of producing sliding sleeves for gearshift mechanism, comprising the steps of:

providing a preform having a cylindrical shape and an inner circumferential surface and an outer circumferential surface;

mounting a tool mandrel having an external toothing within the preform;

moving at least one spinning roll axially along the outer circumferential surface of the preform to form an image of the external toothing on the inner circumferential surface of the preform;

profiling the outer circumferential surface of the preform with the tool mandrel within the preform by utilizing at least one profile roll against the outer circumferential surface so that the preform comprises a formed part, the formed part having a plurality of axially successive identical profile sections on the outer circumferential surface and the image on the internal circumferential surface; and removing the tool mandrel from within the formed part.

7. The method according to claim 6, including the step of cutting the formed part into a plurality of sliding sleeves, wherein each of the sliding sleeves includes one of the profile sections that is identical to the profile sections of each of the other ones of the sliding sleeves.

8. The method according to claim 7, wherein components at ends of the formed part that are made by cutting the formed part do not have the same profile section as the sliding sleeves located therebetween that are made by cutting the formed part.

9. A method of producing sliding sleeves for gearshift mechanism, comprising the steps of:

providing a preform having a cylindrical shape and an inner circumferential surface and an outer circumferential surface;

mounting a tool mandrel having an external toothing within the preform;

moving at least one spinning roll axially along the outer circumferential surface of the preform to form an image of the external toothing on the inner circumferential surface of the preform;

subsequent to forming the image on the inner circumferential surface of the preform, profiling the outer circumferential surface of the preform by utilizing at least one profile roll against the outer circumferential surface so that the preform comprises a formed part, the formed part having a plurality of axially successive identical profile sections on the outer circumferential surface and the image on the internal circumferential surface; and removing the tool mandrel from within the formed part, wherein the method is free from the step of machining the preform or the formed part.

10. The method according to claim 9, including the step of cutting the formed part into a plurality of sliding sleeves, wherein each of the sliding sleeves includes one of the profile sections that is identical to the profile sections of each of the other ones of the sliding sleeves.

11. The method according to claim 10, wherein components at ends of the formed part that are made by cutting the formed part do not have the same profile section as the sliding sleeves located therebetween that are made by cutting the formed part.

12. The method according to claim 9, wherein the step of profiling the outer circumferential surface is subsequent to the step of moving the at least one spinning roll to form an image of the external toothing.

* * * * *